United States Patent
Haupt et al.

(10) Patent No.: US 11,872,868 B2
(45) Date of Patent: Jan. 16, 2024

(54) SLIDING TEMPERATURE DOOR ARCHITECTURE FOR HVAC MODULE

(71) Applicant: Hanon Systems, Daejeon (KR)

(72) Inventors: Eric Haupt, Livonia, MI (US);
Jayanthi Iyer, Northville, MI (US);
Dennis Vermette, Westland, MI (US)

(73) Assignee: HANON SYSTEMS, Daejeon (KR)

( * ) Notice: Subject to any disclaimer, the term of this patent is extended or adjusted under 35 U.S.C. 154(b) by 538 days.

(21) Appl. No.: 15/931,680

(22) Filed: May 14, 2020

(65) Prior Publication Data
US 2020/0384830 A1 Dec. 10, 2020

Related U.S. Application Data

(60) Provisional application No. 62/858,518, filed on Jun. 7, 2019.

(51) Int. Cl.
*B60H 1/00* (2006.01)

(52) U.S. Cl.
CPC ..... *B60H 1/00692* (2013.01); *B60H 1/00021* (2013.01); *B60H 1/00521* (2013.01); *B60H 1/00842* (2013.01)

(58) Field of Classification Search
CPC ............ B60H 1/00842; B60H 1/00521; B60H 1/00021; B60H 1/00692
See application file for complete search history.

(56) References Cited

U.S. PATENT DOCUMENTS

| | | | | |
|---|---|---|---|---|
| 4,852,638 | A * | 8/1989 | Hildebrand | ........ B60H 1/00678 |
| | | | | 137/513.5 |
| 6,450,246 | B1 * | 9/2002 | Kurokawa | ......... B60H 1/00692 |
| | | | | 165/42 |
| 6,579,167 | B1 * | 6/2003 | Demeniuk | ......... B60H 1/00671 |
| | | | | 454/126 |
| 10,131,199 | B2 * | 11/2018 | Nakao | ................ B60H 1/00692 |

FOREIGN PATENT DOCUMENTS

| | | |
|---|---|---|
| JP | H10250347 A | 9/1998 |
| JP | 2016043752 A | 4/2016 |
| JP | 2018127028 A | 8/2018 |
| KR | 20120093768 A | 8/2012 |

* cited by examiner

*Primary Examiner* — Devon Russell
(74) *Attorney, Agent, or Firm* — Shumaker, Loop & Kendrick, LLP; James D. Miller

(57) ABSTRACT

An air handling system of a heating, ventilating, and air conditioning system for a vehicle includes a housing including a mixing and conditioning section. The mixing and conditioning section has an evaporator core and a heater core disposed therein. The heater core is disposed downstream from the evaporator core. A first primary door is disposed intermediate the evaporator core and the heater core. A second primary door is disposed downstream from the heater core.

19 Claims, 5 Drawing Sheets

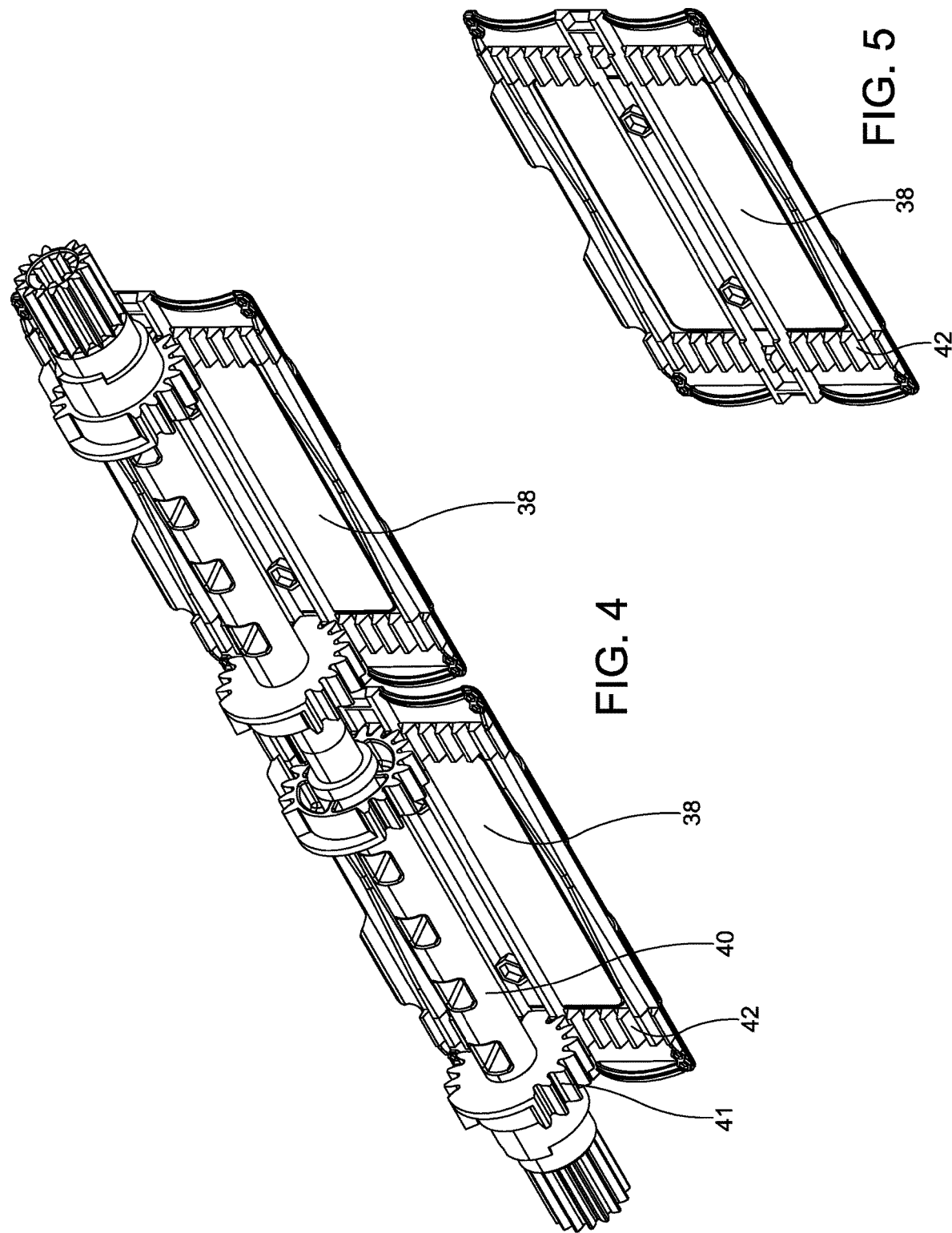

SLIDING TEMPERATURE DOOR ARCHITECTURE FOR HVAC MODULE

CROSS-REFERENCE TO RELATED PATENT APPLICATION

This patent application claims priority to U.S. Provisional Patent Application Ser. No. 62/858,518 filed on Jun. 7, 2019, the entire disclosure of which are hereby incorporated herein by reference.

FIELD OF THE INVENTION

The invention relates to a heating, ventilating, and air conditioning system for a vehicle and more particularly to a sliding temperature door of a heating, ventilating, and air conditioning system for a vehicle.

BACKGROUND OF THE INVENTION

As is commonly known, vehicles typically include a heating, ventilating, and air conditioning (HVAC) system. The HVAC system maintains a temperature within a passenger compartment of the vehicle at a comfortable level for a passenger by providing a desired heating, cooling, and ventilation to the passenger compartment. The HVAC system conditions air flowing therethrough and distributes the conditioned air throughout the passenger compartment.

The HVAC systems include features that control air flow volume, air temperature, and air flow paths, for example. Performance of the HVAC system may be designed to comply with particular targets including temperature stratification and linearity, wherein linearity is a predictable rate of change in temperature. For all operating states, it can be desirable to manipulate hot air streams and cold air streams to produce proper temperatures and the predictable rate of change in the temperature.

In an attempt to achieve desired stratification and linearity targets, HVAC systems may include features including baffles, conduits, mixing plates, and/or doors to facilitate mixing or blending of the hot air streams with the cold air streams. The addition of these features and/or components can reduce airflow volume, degrade flow efficiency, increase noise, vibration and harshness (NVH), and increase the cost, electricity required for the system, package size, and weight of the HVAC system.

For example, one component employed to control temperature parameters of the HVAC system is a sliding door. However, known HVAC systems with sliding doors may use sliding doors upstream from the heater core wherein temperature control paths are divided into multiple quadrants. As a result, additional doors, ribs, baffles, and control features are required to force separated hot air streams and cold air streams together and control the temperature in each temperature control path. As mentioned, the additional components result in an increase in package size of the HVAC system and difficulty managing desired temperature stratification and linearity.

It would therefore be desirable to provide an HVAC system arrangement with a sliding temperature door, wherein a temperature linearity, temperature stratification, a flow efficiency, an NVH, and an airflow volume distribution control of the HVAC system are optimized and a cost, a package size, and a weight of the HVAC system are minimized.

SUMMARY OF THE INVENTION

In accordance and attuned with the present invention, an HVAC system arrangement with a sliding temperature door, wherein a temperature linearity, temperature stratification, a flow efficiency, an NVH, and an airflow volume distribution control of the HVAC system are optimized and a cost, a package size, and a weight of the HVAC system are minimized, has surprisingly been discovered.

According to an embodiment of the disclosure, an air handling system of a heating, ventilating, and air conditioning system for a vehicle includes a housing including a mixing and conditioning section. The mixing and conditioning section has an evaporator core and a heater core disposed therein. The heater core is disposed downstream from the evaporator core. A first primary door is disposed intermediate the evaporator core and the heater core. A second primary door is disposed downstream from the heater core.

According to another embodiment of the disclosure, an air handling system of a heating, ventilating, and air conditioning system for a vehicle is disclosed. A housing is configured to convey air therethrough. The housing has a first wall and a second wall. The housing includes a mixing and conditioning section having an evaporator core and a heater core disposed therein. The heater core is disposed downstream from the evaporator core. The heater core is spaced from the first wall and the second wall. A first primary door selectively prevents air from flowing through the heater core or through an area between the first wall and the heater core. A second primary door selectively prevents air from flowing through an area between the second wall and the heater core.

According to yet another embodiment of the disclosure, an air handling system of a heating, ventilating, and air conditioning system for a vehicle is disclosed. The system includes a housing including a mixing and conditioning section, an evaporator core disposed in the mixing and conditioning section, and a heater core disposed downstream from the evaporator core. The heater core is positioned to divide the housing into a first flow zone for receiving a first partial flow of the air, a second flow zone for receiving a second partial flow of the air, and a third flow zone for receiving a third partial flow of the air. A first sliding door selectively prevents air from flowing through the second flow zone and the third flow zone and a second sliding door selectively preventing air from flowing through the first flow zone.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawing which:

FIG. 4 illustrates a bottom perspective view of a shaft and door panels of the primary door of FIG. 3;

FIG. 5 illustrates a bottom perspective view of one of the door panels of FIG. 4.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

A" and "an" as used herein indicate "at least one" of the item is present; a plurality of such items may be present, when possible. Spatially relative terms, such as "front," "back," "inner," "outer," "bottom," "top," "horizontal," "vertical," "upper," "lower," "side," "above," "below," "beneath," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
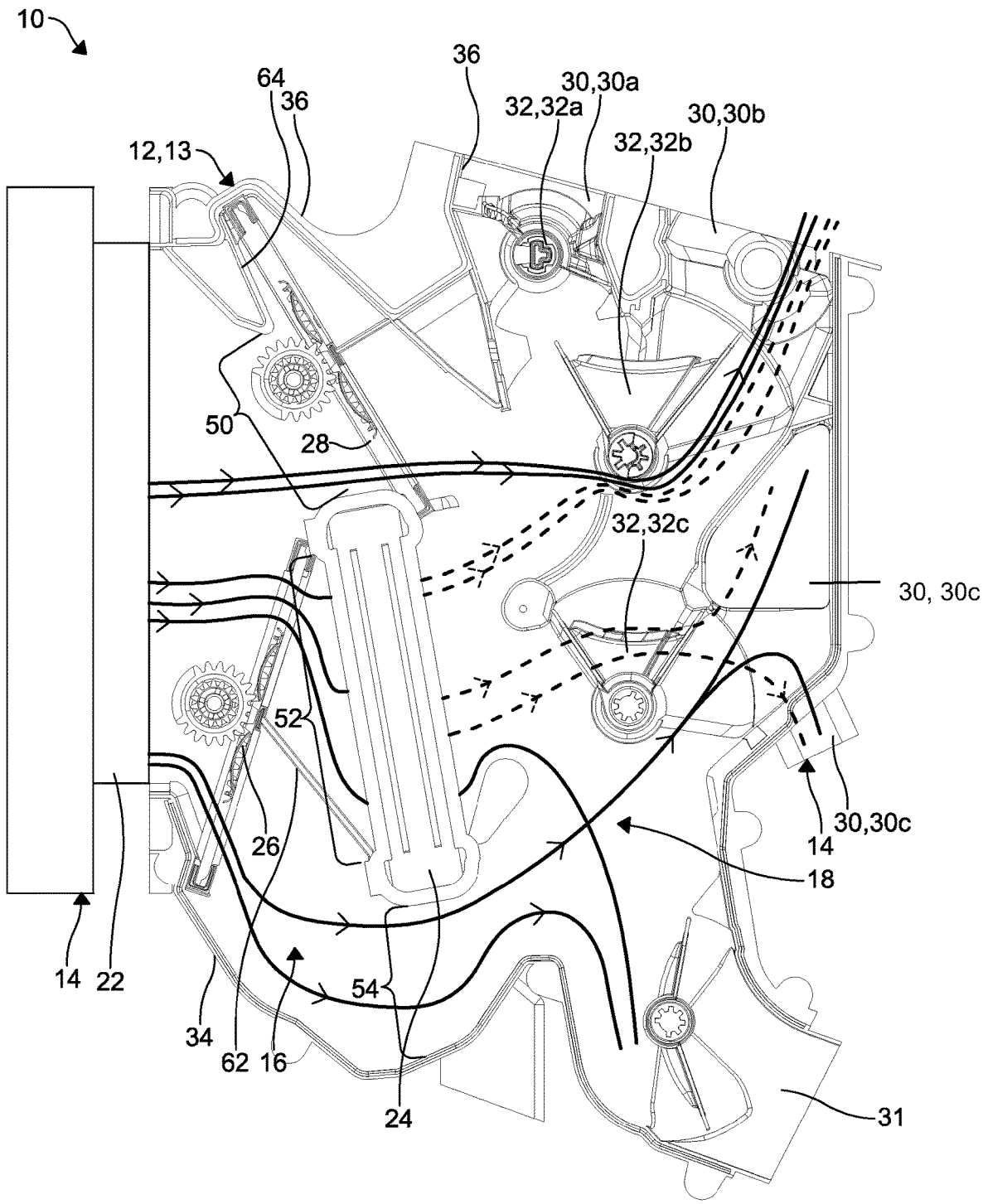
FIG. 1 illustrates a right side cross-sectional elevational view of an air handling system of a heating, ventilating, and air conditioning system for a vehicle according to an embodiment of the invention.
Figure 2:
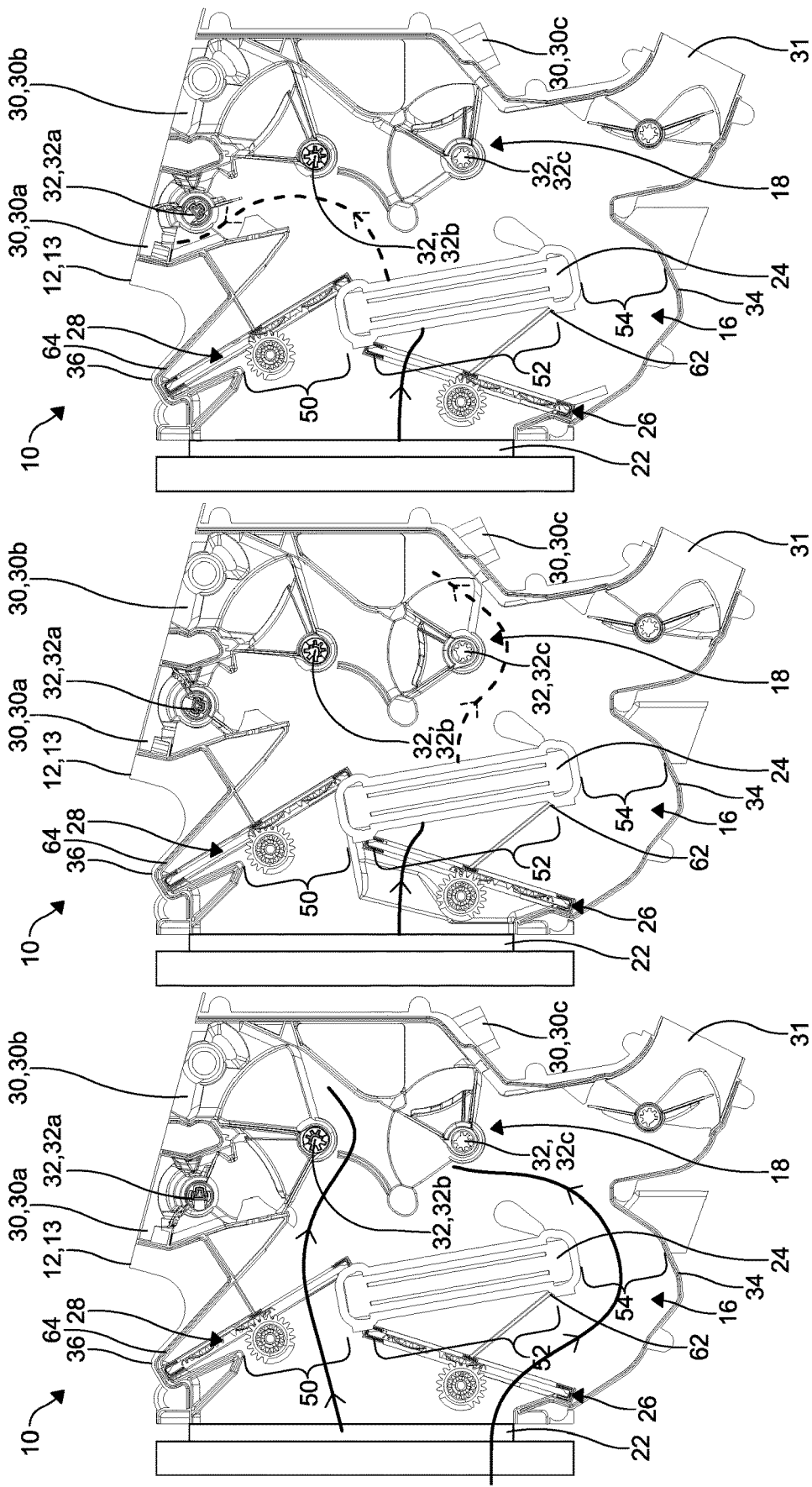
FIG. 2A illustrates a right side cross-sectional elevational view of the air handling system of FIG. 1, wherein a first orientation of distribution doors of the heating, ventilating, and air conditioning system is shown.
FIG. 2B illustrates a right side cross-sectional elevational view of the air handling system of FIGS. 1-2A, wherein a second orientation of the distribution doors is shown.
FIG. 2C illustrates a right side cross-sectional elevational view of the air handling system of FIGS. 1-2B, wherein a third orientation of the distribution doors is shown.
Figure 3:
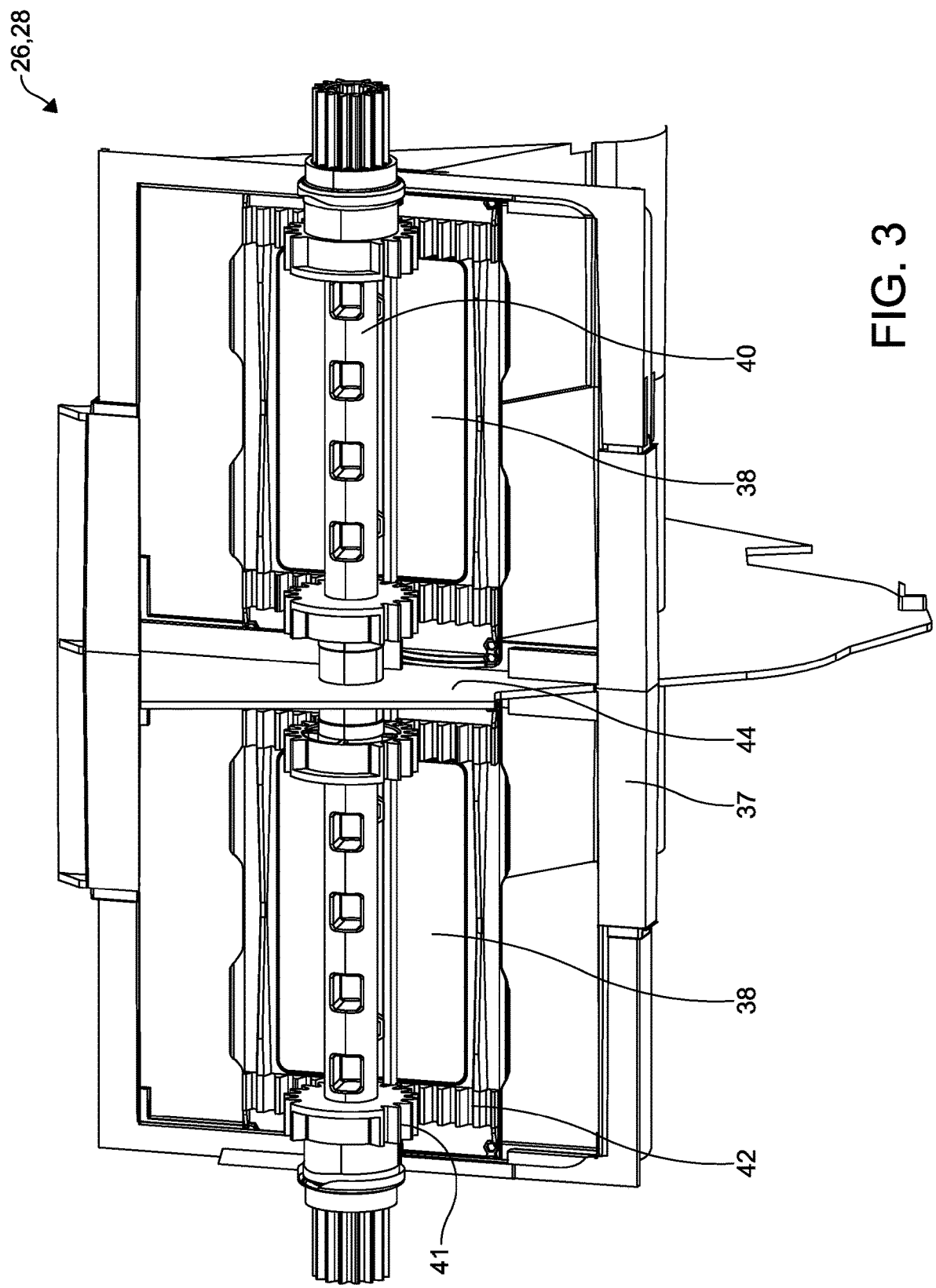
FIG. 3 illustrates a front perspective view of a primary door of the air handling system of FIGS. 1-2C.
Figure 6:
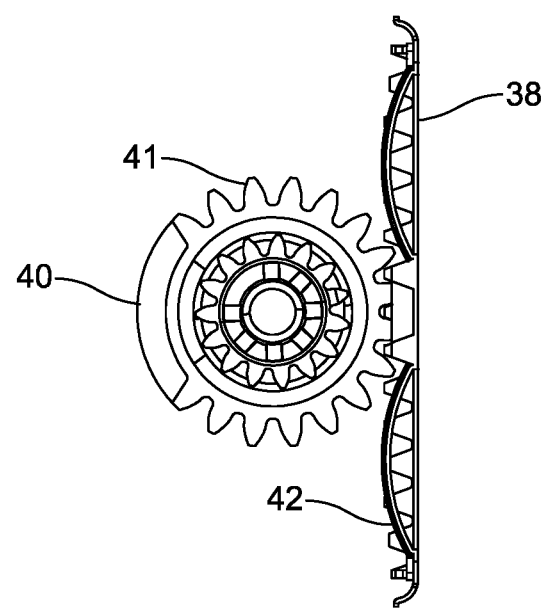
FIG. 6 illustrates right side elevational view of the shaft and door panels of FIG. 4.

FIGS. 1-2C illustrate an air handling system 10 of a heating, ventilating, and air conditioning (HVAC) system or climate control system according to an embodiment of the disclosure. As used herein, the term air can refer to a fluid in a gaseous state, a fluid in a liquid state, or any combination thereof. The air handling system 10 typically provides heating, ventilation, and air conditioning for a passenger compartment (not shown) of a vehicle. The air handling system 10 is adapted to be installed between sheet metal (not shown) and an interior trim panel (not shown) of the vehicle. It is understood that the air handling system 10 can be installed in other locations in the vehicle as desired such as under an instrument panel, to a dash panel, in a trunk, in a console, under a floor, in a headliner, or in an engine compartment, for example. Additionally, the air handling system 10 can be employed for other types of applications besides vehicles, if desired.

The air handling system 10 includes a hollow main housing 12. The housing 12 may be formed by the cooperation of a first housing shell 13 and a second housing shell (not shown). While not shown, the second housing shell may interface with the first housing shell 13 along peripheral regions thereof to form the lateral side walls and portions of the peripherally extending side walls of the housing 12. The peripheral regions of the first housing shell 13 and the second housing shell are configured to abut each other along substantially the same dividing plane about a periphery of each of the first housing shell 13 and the second housing shell. The second housing shell may be considerably a mirror image of the first housing shell 13.

The housing 12 includes an inlet section 14, a mixing and conditioning section 16, and a delivery section 18. The inlet section 14 is in fluid communication with a supply of air. The supply of air can be provided from outside of the vehicle, recirculated from the passenger compartment of the vehicle, or a mixture of the two, for example. The inlet section 14 may include other components such as a blower or fan (not shown) for causing the supply of air to flow to the mixing and conditioning section 16. If desired, a filter (not shown) can be provided upstream or downstream of the inlet section 14 to filter out debris or contaminants carried by the supply of air.

The mixing and conditioning section 16 includes an evaporator core 22, a heater core 24, and a pair of primary doors (herein designated as a first primary door 26 and a second primary door 28). The evaporator core 22 and the heater core 24 are in communication with a source of cooled fluid (not shown) and a source of heated fluid (not shown) respectively. The evaporator core 22 may form a portion of a primary refrigerant circuit of the air conditioning system associated with the air-handling system 10. The evaporator core 22 is configured to exchange heat between the air flowing through the housing 12 and the cooled fluid flowing through the evaporator core 22 to cool and/or dehumidify the air. Although described as the evaporator core 22, it should be understood that any form of cooling device in heat exchange relationship with any device or system of the motor vehicle may be employed for use with the air-handling system 10 without departing from the scope of the present disclosure.

The heater core 24 may be associated with a coolant circuit used to cool an engine of the motor vehicle. The heater core 24 is further configured to exchange heat between the air flowing through the housing 12 and a coolant circulated through the coolant circuit to heat the air. Alternatively, the heater core 24 may be in heat exchange relationship with a fluid used to cool a battery or other heat producing device associated with the motor vehicle or the heater core 24 may be a heating device configured to produce heat using an electrical source. It should be understood that any form of heating device suitable for heating a flow of air therethrough may be used in place of the heater core 24 without departing from the scope of the present disclosure.

The evaporator core 22 is disposed at a downstream end of the inlet section 14 and extends across an entirety of the flow cross-section of the mixing and conditioning section 16 to ensure that all air passing through the mixing and air conditioning section 16 initially flows through the evaporator core 22. The heater core 24 extends laterally between two lateral sides of the housing 12 such as between a lateral side of the first housing shell 13 and lateral side of the second housing shell, but does not occupy an entirety of the flow cross-section of the mixing and conditioning section 16 with respect to a height direction arranged perpendicular to the lateral direction, thereby allowing for flow beneath or above the heater core 24. For example, as illustrated, the heater core 24 extends between, but yet is, spaced from a first wall 34 and a second wall 36, wherein the height direction extends between the first wall 34 and the second wall 36.

The delivery section 18 includes outlets 30 (a first outlet 30a, a second outlet 30b, and a third outlet 30c) for supplying conditioned air from the mixing and conditioning section 16 to the passenger compartment of the vehicle. For example, the first outlet 30a is configured as a defrost outlet for providing air to a windshield of a vehicle, the second outlet 30b is configured as a panel outlet for providing air to a passenger panel of the vehicle, and the third outlet 30c is configured as a floor outlet for providing the air to the floor of the passenger compartment. However, it is understood, the outlets 30 can be included in the mixing and conditioning section 16, if desired. Additionally, more or fewer outlets can be included without departing from the scope of the present disclosure. The delivery section 18 also includes a conduit 31 for conveying the air to other areas of the passenger compartment such as a rear passenger compartment of the vehicle or recirculating the air back to the inlet section 14.

The delivery section 18 includes distribution doors 32 (a first distribution door 32a, a second distribution door 32b, and a third distribution door 32c) for selectively conveying the conditioned air to the respective one of the outlets 30. A fourth door 32d is disposed in the conduit 31 for selectively conveying the conditioned air.

The mixing and conditioning section 16 of the housing 12 includes a flow cross-section configured for delivering conditioned air to the passenger compartment. The mixing and conditioning section 16 delivers the conditioned air to the outlets 30 and vents of the passenger compartment associated with the front seat region of the vehicle, including directing the air towards the front passengers of the vehicle as well as the windshield and the side windows of the vehicle when a defrosting or defogging process is desired. The mixing and conditioning section 16 delivers the conditioned air to a secondary region of the vehicle such as the rear seat region of the vehicle. However, the mixing and conditioning section 16 can deliver the conditioned air to any region of the motor vehicle as desired or recirculated back to the air handling system 10.

As shown in FIGS. 2A-2C, each of the distribution doors 32a, 32b, 32c selectively rotate between an open position and a closed position. In the open position, the distribution doors 32a, 32b, 32c permit the air to flow to the respective ones of the outlets 30a, 30b, 30c. In the closed position, the distribution doors 32a, 32b, 32c prevent air from flowing to the respective ones of the outlets 30a, 30b, 30c. For example, FIG. 2A illustrates the second distribution door 30b in an open position to permit the air to flow to the second outlet 30b. The first distribution door 32a and the third distribution door 32c are shown in the closed position to prevent the air from flowing to the respective ones of the outlets 30a, 30c. In FIG. 2B, the third distribution door 30c in an open position to permit the air to flow to the third outlet 30c. The first distribution door 32a and the second distribution door 32b are shown in the closed position to prevent the air from flowing to the respective ones of the outlets 30a, 30b. In FIG. 2C, the first distribution door 30a is in an open position to permit the air to flow to the first outlet 30a. The second distribution door 32b and the third distribution door 32c are shown in the closed position to prevent the air from flowing to the respective ones of the outlets 30a, 30c. It is understood, the distribution doors 32a, 32b, 32c can be in any position as desired. For example, more than one of the distribution doors 32 can be in the open position simultaneously, all of the distribution doors 32 can be in the closed position, or any of the distribution doors 32 can be in between the open position and the second position, if desired.

With renewed reference to FIGS. 1-2C, the positioning of the heater core 24 divides the housing 12 into a first flow zone 50, a second flow zone 52, and a third flow zone 54. The first flow zone 50 is defined by the area permitting the air to flow from the evaporator core 22 and above the heater core 24 (i.e. area between the heater core 24 and the second wall 36) to the delivery section 18. The second flow zone 52 is defined by the area permitting the air to flow from the evaporator core 22 and through the heater core 24 to the delivery section 18. The third flow zone 54 is defined by the area permitting the air to flow from the evaporator core 22, and below the heater core 24 (i.e. the area between the heater core 24 and the first wall 34) to the delivery section 18. The air flowing through the first flow zone 50 and the third flow zone 54 conveys cool flows of the air, as indicated by the solid arrows, from the evaporator core 22 to the delivery section 18. The air flowing through the second zone 52 conveys a cool flow of air to the heater core 24 and a warm flow of air, as indicated by the dashed arrows, from the heater core 24 to the delivery section 18.

The first primary door 26 and the second primary door 28 are configured as a sliding door or a linearly moving door. The first primary door 26 is disposed downstream from the evaporator core 22 and upstream from the heater core 24. The first primary door 26 extends from the first wall 34 of the housing 12 to an intermediate lengthwise portion of the housing 12. The first primary door 26 slides between a first position and a second position to route a flow of the air through the heater core 24 and/or below the heater core 24. In the embodiment illustrated, the first primary door 26 extends from the first wall 34 to an upper end of the heater core 24. The first primary door 26 extends the entirety of the second flow zone 52 and the third flow zone 54. A partition 62 extends from the lower end of the heater core 24 to an intermediate portion between ends of the first primary door 26. As such, when the first primary door 26 is in the first position, the first primary door 26 cooperates with the partition 62 to close the second flow zone 52 so the air only flows around the heater core 24. When the first primary door 26 is in the second position, the first primary door 26 cooperates with the partition 62 to close the third flow zone 54 so the air is permitted to flow through the heater core 24. When the first primary door 26 is intermediate the first position and the second position, the air is permitted to flow beneath the heater core 24 and through the heater core 24. The partition 62 may form a portion of framing of first primary door 26, described in further detail herein below.

The second primary door 28 is disposed adjacent the heater core 24 at a position downstream from the heater core 24 and extends from the second wall 36 of the housing 12 opposite the first wall 34 to a downstream side of the heater core 24. The second sliding door 28 slides between a first position and a second position to either permit or not permit air to flow between the heater core 24 and the second wall 36. As shown, a portion of the second primary door 28 is received in a secondary chamber 64 extending or protruding outwardly from the second wall 36 of the housing 12. As such, when the second primary door 28 is in the first position, the air is permitted to flow between the heater core 24 and the second wall 36 through the first flow zone 50. When the second primary door 28 is in the second position, the second primary door 28 cooperates with the second wall 36 to prevent the air from flowing through the first flow zone 50. When the second primary door 28 is intermediate the first position and the second position, the air is permitted to flow through a portion of the first flow zone 50.

With reference to FIG. 2A, the first primary door 26 is in the first position and the second primary door 28 is in the first position. As such, the cool flow of the air from the evaporator core 22 flows through the first flow zone 50 and the third flow zone 54 and not through the heater core 24. As such, the cool flow of air is delivered to the delivery section 18 and conveyed to the desired ones of the outlets 30. As stated hereinabove, in the example shown in FIG. 2A the cool air flow is being conveyed to the second outlet 30b.

With reference to FIG. 2B, the first primary door 26 is in the second position and the second primary door 28 is in the second position. As such, the air from the evaporator core 22 only flows through the second flow zone 52 and not through the first flow zone 50 and the third flow zone 54. As such, the warm flow of air is delivered to the delivery section 18 and conveyed to the desired ones of the outlets 30. As stated hereinabove, in the example shown in FIG. 2B, the warm flow of the air from the heater core 24 is being conveyed to the third outlet 30c. However, it is understood, the warm flow of the air can be delivered to any of the outlets 30 or the conduit 31, if desired.

With reference to FIG. 2C, the first primary door 26 is in the second position and the second primary door 28 is in the second position. As such, the air from the evaporator core 22 only flows through the second flow zone 52 and not through the first flow zone 50 and the third flow zone 54. As such, the warm flow of air is delivered to the delivery section 18 and conveyed to the desired ones of the outlets 30. As stated hereinabove, in the example shown in FIG. 2C, the warm flow of the air from the heater core 24 is being conveyed to the first outlet 30a. However, it is understood, the warm flow of the air can be delivered to any of the outlets 30 or the conduit 31.

As shown in FIG. 1, the first primary door 26 is in between the first position and the second position and the second primary door 28 is in between the first position and the second position. As such, the air from the evaporator core 22 flows through each of the flow zones 50, 52, 54. As such, a mixture of the cool flow of air and the warm flow of the air is delivered to the delivery section 18 and conveyed to the desired ones of the outlets 30. In the example shown in FIG. 1, the mixture of the air is being conveyed to the second outlet 30b and the third outlet 30c. However, it is understood, the mixture of the air can be delivered to any of the outlets 30 or the conduit 31.

FIGS. 3-6 illustrate the first primary door 26 according to an embodiment of the present disclosure. The first primary door 26 is configured to slide along a plane arranged substantially transverse to a direction of flow of the air when passing through the mixing and conditioning section 16. The first primary door 26 includes a rotary shaft 40 having a first engaging feature 41 and a substantially planar door panel 38 having a second engaging feature 42 configured to cooperate with the first engaging feature 41. In the illustrated embodiment, the first engaging feature 41 is formed by a plurality of circumferentially spaced teeth projecting radially outwardly from an axis of rotation of the first primary door 26 as formed by the rotary shaft 40 thereof. The second engaging feature 42 is formed by a plurality of linearly spaced teeth that are spaced at intervals corresponding to the circumferential intervals between the teeth of the first engaging feature 41.

The door panel 38 of the first primary door 26 is slidably disposed within a frame member 37 disposed within the housing 12 to cause the door panel 38 to translate along the plane generally defined by the door panel 38. The door panel 38 may be received within a corresponding slot formed in the frame member 37 or the door panel 38 may include structure for engaging a rail or similar structure of the frame member 37, as desired. However, the first primary door 26 may be provided in the absence of the frame member 37 if the housing 12 is provided to include the sliding structure suitable for cooperating with the door panel 38. The rotary shaft 40 is disposed at a position relative to the door panel 38 in a manner wherein rotation of the rotary shaft 40 causes linear displacement of the door panel 38 along the plane defined thereby due to the motion of the first engaging feature 41 being transferred to the second engaging feature 42. Rotation of the rotary shaft 40 in a first rotational direction causes the door panel 38 to slide in a first sliding direction while rotation of the rotary shaft 40 in a second and opposite rotational direction causes the panel to slide in a second sliding direction opposite the first sliding direction. As such, the door panels 38 slide from the first position to the second position of the first primary door 26.

As shown, the first primary door 26 may be provided to include two of the door panels 38 disposed on a common axis of rotation, wherein a first one of the panels 38 is associated with controlling flow in the first housing shell 13 while the second one of the panels 38 is associated with controlling flow into the second housing shell. The associated frame member 37 may accordingly include a dividing structure 44 provided in alignment with a divider of the housing 12 for separating the flow to each of the housing shells. The pair of the door panels 38 may be associated with a common rotary shaft 40 used to rotate both the door panels 38 in unison via a single actuator or each of the door panels 38 may be associated with an independently provided ones of the rotary shaft 40 controlled by an independently provided actuator, as desired. If the door panels 38 are caused to move in unison, the housing shells each receive conditioned air having substantially similar properties due to the similar flow conditions experienced to either side of the divider as a result of the symmetric positioning of each of the door panels 38.

While not shown, it is understood, the second primary door 28 includes substantially identical structure to that of the first primary door 26, including the use of two door panels 38 with one of the panels 38 positioned within a respective one of the housing shells 13.

It is understood other systems and methods of linearly moving the primary doors 26, 28 can be employed if desired. For example, the door panels 38 can be positioned on linear bearings, liner screws, belts, chains, actuators, or any other types of mechanical methods or systems to cause the door panels 38 to move linearly.

The arrangement of the second primary door 28 in relation to the other components (evaporator core 22, heater core 24, first primary door 26, outlets 30, distribution doors 32, walls 34, 36, the partitions 62) in the housing 12 described above achieves desired levels of temperature linearity, stratification, flow efficiency, and noise vibration and harshness (NVH) levels within the air handling system 10 while minimizing cost and package size of the air handling system 10. In prior art systems, when a door is positioned upstream of the heater core, the cold air flows around the heater core are forced to be spaced further away from the hot air flows flowing through the heater core than in the present invention. The structure of the primary doors 26, 28 causes the cold flows of air to flow towards the outer wall of the housing 12. In the prior art, the cold flows of air flowing around the heater core are spaced further away from the ends of the heater core than in the present invention. This spacing is due to positioning the doors upstream from the heater core side instead of directly downstream. In the prior art, the door only being upstream controls both the warm flow of air and the cool flow of air. This is undesired since the shifting from the warm flow of air to the cold flow of air minimizes the amount of flow passing through the warm flow of air. As the doors begin to permit a greater amount of flow through the warm flow of air, the amount flowing through the cold flow of air is decreased and the flow of cold air moves further away from the warm flow of air. As a result, it is more difficult to blend the flows downstream of the heater core without additional mechanical features (i.e. additional baffles, ribs, wall features, doors). Also, the air flowing through the housing must travel over a greater surface area compared to the present invention. The additional features and extra surface area for the air to flow then increases the NVH and decreases the linearity, stratification, and flow efficiency which is undesired.

According to the present invention, because the second primary door 28 is positioned downstream of the heater core 24, the cold flows of the air flowing around the heater core 24 can directly interface with the hot flows of the air flowing through the heater core 24 since the cold flows of the air are spaced much closer to the warm flows of the air. The primary door 28 according to the present invention only controls the cool flow of air. As a result, as the primary door 28 moves to the second position the cool flow of air begins to be directed into a narrow flow of air which increases the velocity. Additionally, the narrower flow of the cool air is adjacent and closer to the warm flow of the air instead of away and adjacent the second wall 36 of the housing. Because of the closer spacing between the cold flows of the air and hot flows of the air, less mechanical features (i.e. additional baffles, ribs, wall features, doors) are required and the air flows over less surface area minimizing the NVH and maximizing linearity, stratification, and flow efficiency. Instead of flowing adjacent the second wall 36, the cold flows of the air flow directly adjacent the heaters core 24 away from the second wall 36 to flow adjacent with and eventually interface with the warm flows of the air. Mixing of the air in the mixing and conditioning section 16 and in the delivery section 18 can be controlled in a more efficient manner.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system of a heating, ventilating, and air conditioning system for a vehicle comprising:
   a housing including a mixing and conditioning section having an evaporator core and a heater core disposed therein, the heater core disposed downstream from the evaporator core with respect to a direction of flow of air;
   a first primary door disposed intermediate the evaporator core and the heater core; and
   a second primary door disposed downstream from the heater core, wherein the heater core is disposed intermediate a first wall and a second wall of the housing and is positioned perpendicular to a direction of a flow of air through the housing,
   wherein the first primary door is selectively positionable between the first wall of the housing and an upper end upstream of the heater core, and a partition extends from a lower end of the heater core to an intermediate portion between the first wall of the housing and the upper end of the heater core.

2. The air handling system of claim 1, wherein the first primary door is a sliding door.

3. The air handling system of claim 1, wherein the second primary door is a sliding door.

4. The air handling system of claim 1, wherein the first primary door is selectively moveable from a first position to a second position, wherein the first primary door in the first position prevents air flowing through the housing from flowing through the heater core and the first primary door in the second position permits the air to flow through the heater core.

5. The air handling system of claim 1, wherein the second primary door is selectively moveable from a first position to a second position, wherein the second primary door in the first position permits air flowing through the housing to flow above the heater core and the primary door in the second position prevents the air from flowing above the heater core.

6. The air handling system of claim 1, wherein the second primary door is partially received in a secondary chamber extending outwardly from the housing.

7. The air handling system of claim 1, further comprising a delivery section disposed downstream from the mixing and conditioning section, the delivery section including a plurality of distribution doors and a plurality of outlets.

8. An air handling system of a heating, ventilating, and air conditioning system for a vehicle comprising:
   a housing configured to convey air therethrough and having a first wall and a second wall, the housing including a mixing and conditioning section having an evaporator core and a heater core disposed therein, the heater core disposed downstream from the evaporator core, the heater core spaced from the first wall and the second wall;
   a first primary door selectively preventing air from flowing through the heater core or through an area between the first wall and the heater core; and
   a second primary door selectively preventing air from flowing through an area between the second wall and the heater core,
   wherein the first primary door is selectively positionable between the first wall of the housing and an upper end upstream of the heater core, and a partition extends from a lower end of the heater core to an intermediate portion between the first wall of the housing and the upper end of the heater core.

9. The air handling system of claim 8, wherein the first primary door is disposed intermediate the evaporator core and the heater core and the second primary door is disposed downstream from the heater core with respect to a direction of a flow of the air through the housing.

10. The air handling system of claim 8, wherein the first primary door and the second primary door are sliding doors.

11. The air handling system of claim 10, wherein the first primary door and the second primary door include a rotary shaft having a first engaging feature and a planar door having a second engaging feature configured to cooperate with the first engaging feature to cause the door to move in a liner direction.

12. The air handling system of claim 11, wherein the first engaging feature is circumferentially spaced teeth projecting radially outwardly from an axis of rotation of the shaft and the second engaging feature is a plurality of linearly spaced teeth formed on the door.

13. The air handling system of claim 10, wherein the first primary door moves from a first position to prevent the air from flowing through the heater core and a second position to prevent the air from flowing between the heater core and the first wall.

14. The air handling system of claim 10, wherein the second primary door moves from a first position to permit the air to flow between the heater core and the second wall and a second position to prevent the air from flowing between the heater core and the second wall.

15. An air handling system of a heating, ventilating, and air conditioning system for a vehicle comprising:
a housing including a mixing and conditioning section;
an evaporator core a disposed in the mixing and conditioning section;
a heater core disposed downstream from the evaporator core, the heater core positioned to divide the housing into a first flow zone for receiving a first partial flow of the air, a second flow zone for receiving a second partial flow of the air, and a third flow zone for receiving a third partial flow of the air;
a first sliding door selectively preventing air from flowing through the second flow zone and the third flow zone; and
a second sliding door selectively preventing air from flowing through the first flow zone, wherein the heater core is disposed intermediate a first wall and a second wall of the housing and is positioned perpendicular to a direction of a flow of air through the housing,
wherein the first primary door is selectively positionable between the first wall of the housing and an upper end upstream of the heater core, and a partition extends from a lower end of the heater core to an intermediate portion between the first wall of the housing and the upper end of the heater core.

16. The air handling system of claim 15, wherein the second sliding door is disposed downstream from the heater core.

17. The air handling system of claim 15, wherein the first partial flow of the air and the third partial flow of the air are cool flows of air and the second partial flow of the air is a warm flow of air.

18. The air handling system of claim 15, wherein the first sliding door is disposed above the heater core and the second sliding door is disposed below the heater core.

19. The air handling system of claim 15, wherein the first sliding door and the second sliding door includes a rotary shaft having a first engaging feature and a planar door having a second engaging feature configured to cooperate with the first engaging feature to cause the door to move in a liner direction.

\* \* \* \* \*